(12) United States Patent
Robertson et al.

(10) Patent No.: US 9,584,518 B1
(45) Date of Patent: Feb. 28, 2017

(54) DYNAMIC COMMUNICATIONS CONTROLLER

(71) Applicant: CALLWARE TECHNOLOGIES, INC., Sandy, UT (US)

(72) Inventors: John M. Robertson, Pleasant Grove, UT (US); William D. Baird, Draper, UT (US); Jason C. Weaver, Salt Lake City, UT (US)

(73) Assignee: CALLWARE TECHNOLOGIES, INC., Sandy, UT (US)

(*) Notice: Subject to any disclaimer, the term of this patent is extended or adjusted under 35 U.S.C. 154(b) by 27 days.

(21) Appl. No.: 14/849,259

(22) Filed: Sep. 9, 2015

(51) Int. Cl.
| | |
|---|---|
| *H04L 29/06* | (2006.01) |
| *H04M 3/42* | (2006.01) |
| *H04L 29/08* | (2006.01) |
| *H04W 4/00* | (2009.01) |
| *G06F 17/30* | (2006.01) |

(52) U.S. Cl.
CPC ........ *H04L 63/10* (2013.01); *G06F 17/30964* (2013.01); *H04L 63/0823* (2013.01); *H04L 63/105* (2013.01); *H04L 65/1006* (2013.01); *H04L 65/1069* (2013.01); *H04L 65/1076* (2013.01); *H04L 67/18* (2013.01); *H04L 67/22* (2013.01); *H04M 3/42263* (2013.01); *H04W 4/008* (2013.01)

(58) Field of Classification Search
CPC ....................................................... H04L 63/10
See application file for complete search history.

(56) References Cited

U.S. PATENT DOCUMENTS

| | | | | |
|---|---|---|---|---|
| 5,930,249 | A * | 7/1999 | Stademann | H04Q 3/66 370/227 |
| 6,078,568 | A * | 6/2000 | Wright | H04L 12/5695 370/312 |
| 6,411,701 | B1 * | 6/2002 | Stademann | H04Q 3/66 379/220.01 |
| 6,498,844 | B1 * | 12/2002 | Stademann | H04Q 3/66 379/220.01 |

(Continued)

FOREIGN PATENT DOCUMENTS

WO    2014043401 A1    3/2014

OTHER PUBLICATIONS

Balzer; PORTS: a method for dynamic interprogram communication and job control; Published in: Proceeding AFIPS '71 (Spring) Proceedings of the May 18-20, 1971, spring joint computer conference; pp. 485-489; ACM Digital Library.*

(Continued)

*Primary Examiner* — Bradley Holder
(74) *Attorney, Agent, or Firm* — Kunzler Law Group, PC

(57) ABSTRACT

Apparatuses, systems, methods, and computer program products are disclosed for a dynamic communications session controller. An identity module is configured to masquerade as a session endpoint to a session controller for a communications protocol using one or more network interfaces. An endpoint selection module is configured to dynamically select a destination for a session intended for a masqueraded session endpoint, based on information from one or more destinations. A routing module is configured to maintain and/or direct connectivity for a session with at least a selected destination using a communications protocol.

27 Claims, 8 Drawing Sheets

(56) References Cited

U.S. PATENT DOCUMENTS

| | | | | |
|---|---|---|---|---|
| 7,158,563 | B2 * | 1/2007 | Ginis | H04L 7/0016 370/201 |
| 7,672,297 | B2 * | 3/2010 | Naqvi | H04L 12/2801 370/352 |
| 7,710,978 | B2 * | 5/2010 | Signaoff | H04L 63/0272 370/395.5 |
| 8,081,704 | B2 * | 12/2011 | Ginis | H04L 7/0016 375/224 |
| 8,346,947 | B2 * | 1/2013 | Ajero | H04L 12/2801 370/352 |
| 8,498,289 | B2 | 7/2013 | Castell et al. | |
| 8,515,029 | B2 | 8/2013 | Shaw | |
| 8,600,391 | B2 | 12/2013 | Vendrow et al. | |
| 8,606,899 | B1 * | 12/2013 | Ryner | H04L 67/14 709/223 |
| 8,630,234 | B2 | 1/2014 | Bjorsell et al. | |
| 8,666,378 | B2 | 3/2014 | Spence et al. | |
| 8,681,897 | B2 * | 3/2014 | Ginis | H04L 7/0016 370/201 |
| 8,687,592 | B2 | 4/2014 | Cheon et al. | |
| 8,700,019 | B2 * | 4/2014 | Ezell | H04W 4/001 379/219 |
| 8,706,893 | B2 * | 4/2014 | Even | H04L 29/06027 370/244 |
| 8,738,774 | B2 * | 5/2014 | Sheng | H04L 67/14 709/223 |
| 8,761,778 | B2 | 6/2014 | Mulcahy et al. | |
| 8,782,263 | B1 | 7/2014 | Nightingale et al. | |
| 8,788,675 | B2 | 7/2014 | Balasuriya | |
| 8,837,704 | B2 | 9/2014 | Ramanathan et al. | |
| 8,918,518 | B2 | 12/2014 | Xue et al. | |
| 8,989,813 | B2 | 3/2015 | LaBauve et al. | |
| 9,015,297 | B2 | 4/2015 | Putman et al. | |
| 9,160,385 | B2 * | 10/2015 | Ginis | H04L 7/0016 |
| 2003/0007497 | A1 | 1/2003 | March et al. | |
| 2005/0096926 | A1 | 5/2005 | Eaton et al. | |
| 2007/0168530 | A1 | 7/2007 | Delaney et al. | |
| 2009/0055475 | A1 | 2/2009 | Sekaran et al. | |
| 2009/0279681 | A1 | 11/2009 | McKee et al. | |
| 2012/0096141 | A1 | 4/2012 | Narjala | |
| 2014/0108794 | A1 | 4/2014 | Barton et al. | |
| 2014/0365674 | A1 | 12/2014 | Rozinov et al. | |

OTHER PUBLICATIONS

Walsh et al.; Scheduling of networked control systems; Published in: IEEE Control Systems (vol. 21, Issue: 1, Feb. 2001 ); pp. 57-65; Date of Publication: Aug. 7, 2002; IEEE Xplore.*

Binns, Todd D., "Intelligent Advanced Communications IP Telephony Feasibility for the U.S. Navy—Phase 2", Office of Naval Research, Mar. 31, 2009, pp. 224, Contract No. N00014-07-C-0832.

Binns. Todd D., Intelligent Advanced Communications IP Telephony Feasibility for the US Navy—Phase 3, Office of Naval Research, Mar. 31, 2011, pp. 382, Contract No. N00014-09-C-0618.

"Unified Capabilities Reference Architecture Version 1.0", Department of Defense Information Enterprise Architecture, Jan. 2013, pp. 60.

"Diagram-2100-hdx-conferencing.png (1030x799)", downloaded May 27, 2015, pp. 1, http://redcom.wpengine.com/wp-content/uploads/2014/01/diagram-2100-hix-conferencing.png.

"Diagram-FOB-Support.jpg (1500x919)", downloaded May 27, 2015, pp. 1, http://redcom.wpengine.com/wp-content/uploads/2014/02/diagram-FOB-Support.jpg.

"Diagram-juice-2013.jpg (1600x972)", downloaded May 27, 2015, pp. 1, http://redcom.wpengine.com/wp-content/uploads/2014/02/diagram-juice-2013.jpg.

"Regionalizing Call Control with a Virtual LSC", REDCOM, downloaded May 27, 2015, pp. 1, Victor, New York, US.

"Local Session Controller: Cisco's Solution for the U.S. Department of Defense Network of the Future", White Paper, Sep. 2011, pp. 11, San Jose, California, US.

PCT/US2016/050833 International Search Report and Written Opinion mailed Jan. 13, 2017.

* cited by examiner

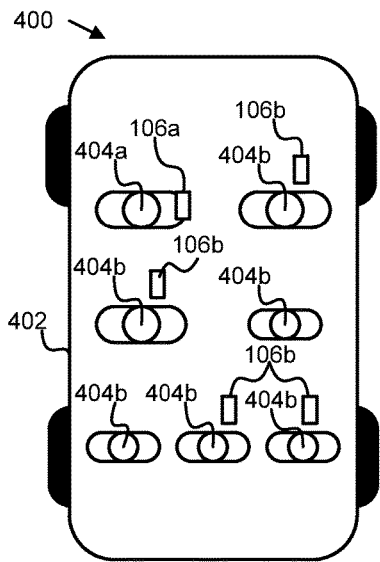
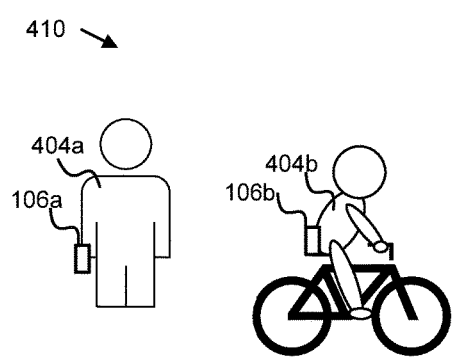
FIG. 4A
FIG. 4B
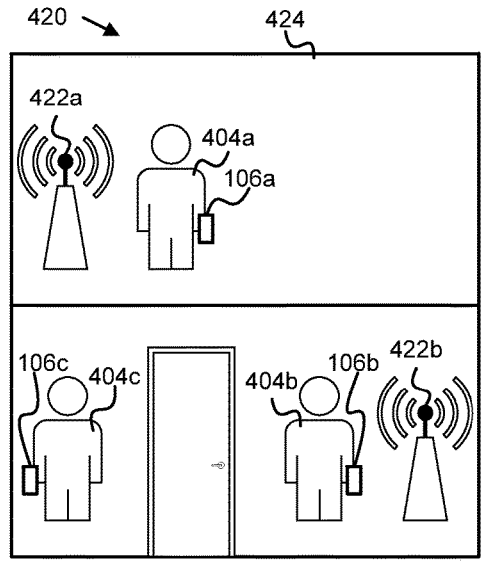
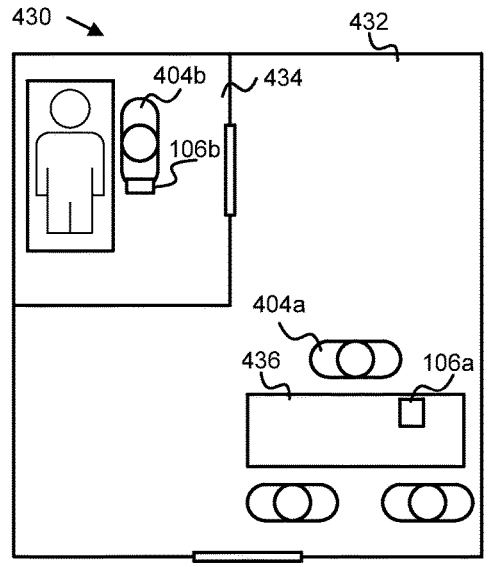
FIG. 4C
FIG. 4D

DYNAMIC COMMUNICATIONS
CONTROLLER

FIELD

This invention relates to communications and more particularly relates to a session controller for dynamically routing communications.

BACKGROUND

Although phone calls and other communications are just as important to businesses as ever, if not more so, communications are becoming increasingly mobile and increasingly on personal devices. Most businesses, however, still rely on wired desk phones and a one to one assignment of a desk phone to an individual employee. Mobile phones are often personal devices, with personal data, and are often insecure. Some users, therefore, may use and carry two mobile phones, one for personal matters and one for business matters.

Some phone systems may blindly forward calls, or use a centrally administered follow me or find me feature with a list of different phone numbers, ringing them each according to some predefined algorithm. Such phone systems typically follow a predefined list, or algorithm, regardless of the situation or external circumstances.

For example, if a user has setup a follow me list including a desk phone extension and a mobile phone number, the phone system will call both numbers when the user receives a phone call, even if the user is operating a vehicle, performing a surgery, in a library, or the like. Even ringing the user's desk phone while the user is out of the office may be unnecessarily bothersome to coworkers.

SUMMARY

Apparatuses for a dynamic communications controller are disclosed. An identity module, in one embodiment, is configured to masquerade as a session endpoint to a session controller for a communications protocol using one or more network interfaces. An endpoint selection module, in certain embodiments, is configured to dynamically select a destination for a session intended for a masqueraded session endpoint based on information from the destination. In a further embodiment, a routing module is configured to maintain and direct connectivity for a session with at least a selected destination using a communications protocol.

An apparatus, in one embodiment, includes means for receiving a communication for a role in an organization. A role, in certain embodiments, comprises a pool of one or more members. In a further embodiment, an apparatus includes means for dynamically selecting a member of a pool for a session for a communication based on information received from one or more devices associated with one or more members.

Systems for a dynamic communications controller are disclosed. In one embodiment, a hardware communications switch comprises a session controller for a communications protocol. An endpoint controller, in a further embodiment, is configured to represent a plurality of endpoints to a session controller and to dynamically route sessions for the endpoints to different destinations based on information received at the endpoint controller from the different destinations.

Methods for a dynamic communications controller are disclosed. A method, in various embodiments, may include one or more of the steps and/or actions described above with regard to the disclosed apparatuses and systems.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4A is a schematic block diagram illustrating one embodiment of a destination;

FIG. 4B is a schematic block diagram illustrating a further embodiment of a destination;

FIG. 4C is a schematic block diagram illustrating another embodiment of a destination;

FIG. 4D is a schematic block diagram illustrating a certain embodiment of a destination;

DETAILED DESCRIPTION

Figure 1A:
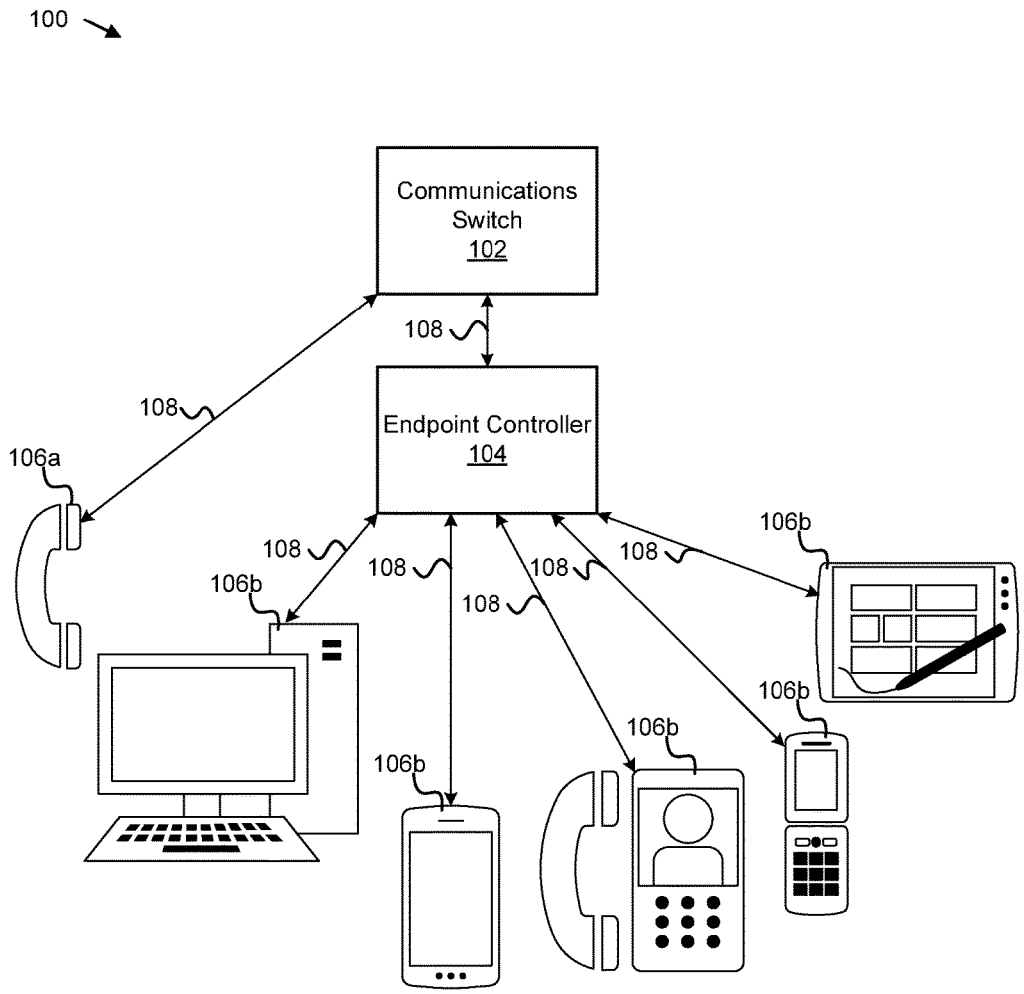
FIG. 1A is a schematic block diagram illustrating one embodiment of a system for a dynamic communications controller.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1A depicts one embodiment of a system 100 for a dynamic communications endpoint controller 104. The system 100, in the depicted embodiment, includes a communications switch 102, an endpoint controller 104, one or more communications devices 106, and one or more communications channels 108. The endpoint controller 104, in certain embodiments, instead of or in addition to routing communications using a follow me and/or a find me list, may intelligently connect, route, and/or connect communications based on information from one or more potential destinations for the communications.

The communications switch 102, in one embodiment, comprises a hardware communications switch. The communications switch 102 and/or the endpoint controller 104 may comprise one or more communications ports and/or interfaces (e.g., one or more physical or virtual network interfaces), such as one or more Ethernet ports (e.g., 8P8C, RJ45), one or more telephone ports (e.g., RJ11, RJ14, RJ25, 6P4C), one or more wireless interfaces (e.g., Wi-Fi® or IEEE 802.11 interface; Bluetooth® interface; mobile telecommunications radio such as 2G, 3G, 4G, and/or 5G interface), one or more fiber-optic transceivers, or other ports and/or interfaces, using which the communications switch 102 may send and/or receive voice and/or data communications over the one or more communications channels 108 (e.g., a local area network (LAN), a wide area network (WAN), the public switched telephone network (PSTN), the Internet, a wireless channel and/or network, a wired channel and/or network, a T1 line, an E1 line, a fiber-optic channel, or the like).

The communications switch 102 and/or the endpoint controller 104, in certain embodiments, may comprise logic hardware or other electrical circuits for processing, managing, and/or routing communications. For example, the communications switch 102 and/or the endpoint controller 104 may comprise one or more printed circuit boards, integrated circuit devices (e.g., an application specific integrated circuit (ASIC), a field programmable gate array (FPGA) or other programmable logic, a processor, a volatile memory circuit, a non-volatile solid-state storage circuit, or the like), discrete electrical devices, or other electrical circuits in communication with the one or more communication ports to receive communications for processing, managing, and/or routing. In a further embodiment, the communications switch 102 and/or the endpoint controller 104 may comprise executable code stored on a non-transitory computer readable storage medium, executable by a processor or other hardware to perform the steps described herein with regard to the communications switch 102 and/or the endpoint controller 104.

The communications switch 102, in one embodiment, may comprise a session controller for a communications protocol. The communications switch 102, in various embodiments, may comprise an enterprise session controller (ESC), a local session controller (LSC), and/or another session controller that implements a session initiation protocol (SIP) or other signaling and/or communications protocol.

The communications switch 102, as a session controller, in certain embodiments, may provide and/or manage connectivity for communications between endpoints 106a, 106b (e.g., clients 106, destinations 106), using and/or in accordance with the communications protocol. The communications switch 102 may provide an application programming interface (API) or other interface for the communications protocol and/or for the session controller to one or more endpoints 106a, 106b over the one or more communications channels 108 (e.g., to create/initiate a communications session, to modify/transfer a communications session, to end/terminate a communications session, or the like).

The communications protocol may be for voice communications, video communications, text communications, data communications, and/or another communication type. In one embodiment, the communications protocol comprises a session initiation protocol (SIP) for initiating, negotiating, signaling, and/or otherwise controlling communications sessions. The communications protocol, in various embodiments, may comprise one or more of SIP, an application layer protocol, a transport layer protocol, a hypertext transfer protocol (HTTP), a simple mail transfer protocol (SMTP), a session description protocol (SDP), a real-time transport protocol (RTP), a secure RTP (SRTP), a transport layer security (TLS) protocol, a chat or instant messaging protocol, a short message service (SMS) protocol, a multimedia messaging service (MMS) protocol, a telephony protocol, a voice protocol, a voice over internet protocol (VOIP), a plain old telephone service (POTS) protocol, a digital enhanced cordless telecommunications (DECT) protocol, an H.323 protocol, XMPP, Jingle, a digital private network signaling system (DPNSS) protocol, a primary rate interface (PRI) protocol, a QSIG protocol, an integrated services digital network (ISDN) protocol, a media gateway control protocol (MGCP), an inter-asterisk exchange (IAX) protocol, an audio protocol, a multimedia protocol, a video protocol, a document protocol, a fax protocol, and/or another protocol.

For example, the communications switch 102 and/or an associated session controller may comprise a private branch exchange (PBX) that connects one or more internal endpoints 106 (e.g., telephone extensions) to the PSTN, provides internal communications among the one or more internal endpoints 106, or the like. In certain embodiments, the communications switch 102 and/or an associated session controller may comprise an internet protocol (IP) PBX with internet protocol connectivity, providing audio, video, text, and/or data communications to and/or from one or more endpoints 106 using a transmission control protocol/internet protocol (TCP/IP) protocol stack, or the like. For example, an IP PBX 102 may support SIP, inter-asterisk exchange (IAX), H.323, XMPP, Jingle, or another VOIP protocol. The communications switch 102 and/or an associated session controller may provide one or more other functions, such as conferencing, voicemail, transcription or speech to text, call recording, auto attendant, auto dialing, directory services, call blocking, call forwarding, call logging, call park, call transfer, call waiting, or the like.

The communications switch 102 (e.g., the session controller) may be configured to receive one or more communications requests of the communications protocol, to broker a communications session between two endpoints 106a, 106b or other destinations 106. An endpoint 106 and/or destination 106 may comprise one or more of a mobile telephone, a wired telephone, a computer device such as a desktop computer or a laptop computer, a tablet computing device, a gaming console, a mobile gaming device, a wearable device such as a smart watch or wristband, a set top box or dongle, a television, and/or another communications device capable of sending and/or receiving a communication. An endpoint 106 may be owned by and/or the property of an organization which owns the communications switch 102 and/or the endpoint controller 104, may be a user's (e.g., an employee's) privately controlled personal device 106. In an embodiment where an endpoint 106 comprises a user's privately controlled personal device 106, the endpoint 106 may comprise a secure footprint (e.g., an application or other computer executable program code) owned by or at least partially controlled by an organization that owns the communications switch 102 and/or the endpoint controller 104, so that communications are secure and/or protected.

Instead of one or more of the endpoints 106 (e.g., an extension, a direct inward dialing (DID) number, a communications device, or the like) registering and/or being registered with the communications switch 102 directly, in certain embodiments, the endpoint controller 104 is configured to masquerade as and/or directly represent the one or more of the endpoints 106 to the communications switch 102, registering itself as the one or more of the endpoints 106. For example, in embodiments where the communications switch 102 comprises a SIP session controller, the endpoint controller 104 may register itself as a plurality of different SIP endpoints 106. The endpoint controller 104 may masquerade as an endpoint 106 transparently, so that the communications switch 102 and/or the session controller may not realize or determine that the endpoint controller 104 is not the actual endpoint 106. By masquerading or otherwise representing itself as an endpoint 106, the endpoint controller 104, in certain embodiments, may dynamically connect and/or route communications sessions to different destinations; endpoint devices 106a, 106b; users; roles; or the like, based on information from the different destinations and/or on other factors.

For example, in certain embodiments, the communications switch 102 and/or the endpoint controller 104 may receive a communications request (e.g., a phone call, a chat or text message, an email, a document, a video conference, or the like) for a role (e.g., in an organization or the like). A role, in one embodiment, may comprise a pool of one or more members. Different pool members for a role may be associated with different endpoint devices 106a, 106b (e.g., different destinations for a communication and/or communication session), and the endpoint controller 104 may be configured to select one of the endpoint devices 106a, 106b for a communication for the role based on information from the different endpoint devices 106a, 106b, such as global positioning system (GPS) data, gyroscope data, accelerometer data, speed and/or velocity data, or other location and/or sensor data; proximity information of an endpoint device 106a, 106b to an external sensor, to another endpoint device 106a, 106b, to a wireless access point, or the like; or other information from a potential destination for a communication.

The endpoint controller 104, in various embodiments, may register for, receive, and/or route one or more live or non-live communications from the communications switch 102 to one or more endpoints 106a, 106b, such as one or more of audio, text, video, documents, and/or other communications data. The endpoint controller 104 may masquerade as and/or represent one or more endpoints assigned to a user (e.g., a human individual), a role, an organization, a functional and/or organizational resource (e.g., a fax machine, a conference room, a vehicle), a project (e.g., with a project name, an objective or goal, associated with one or more individuals, or the like), or the like, and such endpoints may comprise a phone number, an extension number, an IP address, a media access control (MAC) address, and/or another endpoint identifier, as configured by the communications switch 102. In this manner, a first user, communications device 106a, endpoint 106a, or the like may send a communications request or otherwise initiate a communication and/or communications session with a user, a role, an organization, or the like with a phone number, extension number, or other identifier, without knowledge of which endpoint 106b the endpoint controller 104 selects for the communication and/or communications session.

In a further embodiment, the endpoint controller 104 may be configured to receive a request for an individual, a role, an organization, or the like without a phone number or extension number, but with another identifier, such as a name, a title, an email address, a username, a department, or the like. The endpoint controller 104 may query a directory (e.g., a lightweight directory access protocol (LDAP) server), a database, a lookup table, and/or another data structure with the received identifier, to determine one or more endpoints 106 associated with the identifier, in order to select an endpoint 106 as a destination for the requested communication and/or communication session.

By dynamically routing and directing communications by role, organization, project, resource, or the like to different destinations 106 based on information from one or more of the different destinations 106, in one embodiment, the endpoint controller 104 may allow an organization to retain ownership of a communication, a contact role, contact information, or the like, even if an employee or other contact person leaves the organization. Further, in one embodiment, the ownership and privacy of an individual's personal device 106, personal phone number, and/or personal information may be retained and/or protected from encroachment, while remaining accessible to an organization for the organization's purposes through the endpoint controller 104.

In certain embodiments, the endpoint controller 104 allows the content of an organization's communications, audio, visual, textual, document, live, non-live, or the like; made on the organization's behalf by its agents through privately controlled personal devices 106 to be logged, recorded, and/or archived. The endpoint controller 104, in a further embodiment, may allow an organization to provide a healthier environment by reducing the number of intimate shared surfaces for communicable diseases (e.g., desktop telephones or other communications devices), replacing them with personal mobile communication devices (e.g., mobile phones) that are not typically shared. The endpoint controller 104, in this manner, may invert the practice and paradigm, in certain embodiments, so that roles, resources, and/or projects are the primary targets for communication session connectivity instead of individuals, and individuals may be coordinated as secondary targets, reprioritized by the endpoint controller 104, and able to be selected from a pool of individuals as needed to fulfill the primary session connectivity objectives of an organization, or the like.

In the embodiment depicted in FIG. 1A, the endpoint controller 104 is separate from, but in communication with, the communications switch 102. For example, the endpoint controller 104 may comprise a separate hardware appliance (e.g., comprising one or more of an ASIC, an FPGA, a processor, one or more communication interfaces such as a network adapter, a volatile memory, non-volatile storage, a power supply, or the like) in communication with the communications switch 102 (e.g., a separate hardware appliance) over a network 108. In a further embodiment, the endpoint controller 104 may comprise computer executable program code, executing on a processor of a host computing device, and the host computing device may be in communication with the communications switch 102 over the network 108.

Figure 1B:
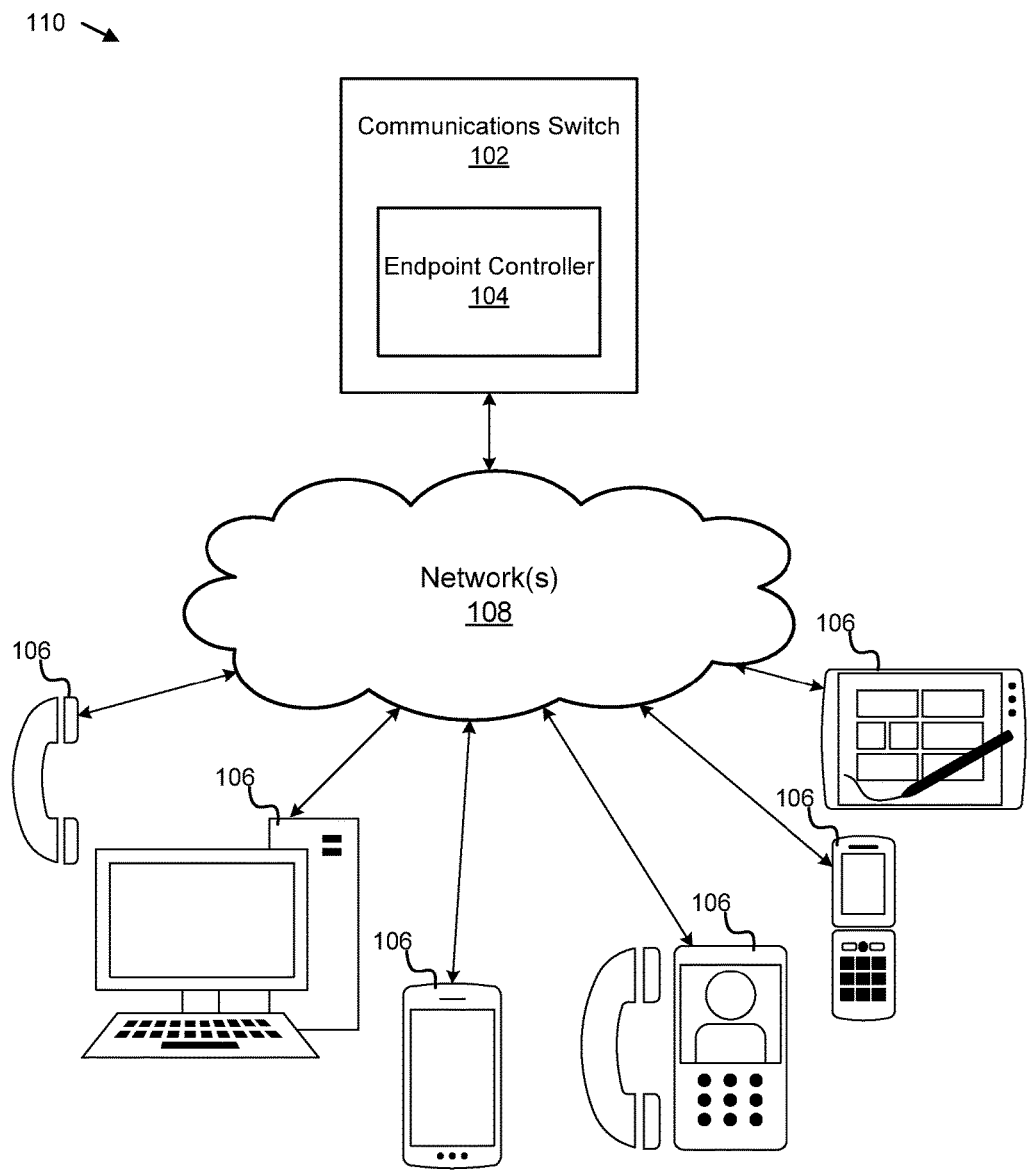
FIG. 1B is a schematic block diagram illustrating a further embodiment of a system for a dynamic communications controller.

FIG. 1B depicts a further embodiment of a system 110 for a dynamic communications endpoint controller 104. The system 110 of FIG. 1B, in certain embodiments, may be substantially similar to the system 100 of FIG. 1A, comprising a communications switch 102, an endpoint controller 104, one or more communications devices 106, and one or more communications networks 108. In the embodiment depicted in FIG. 1B, however, the endpoint controller 104 is integrated with the communications switch 102, as a single hardware appliance or device, as computer executable program code executing on the same host computing device, or the like.

Figure 1C:
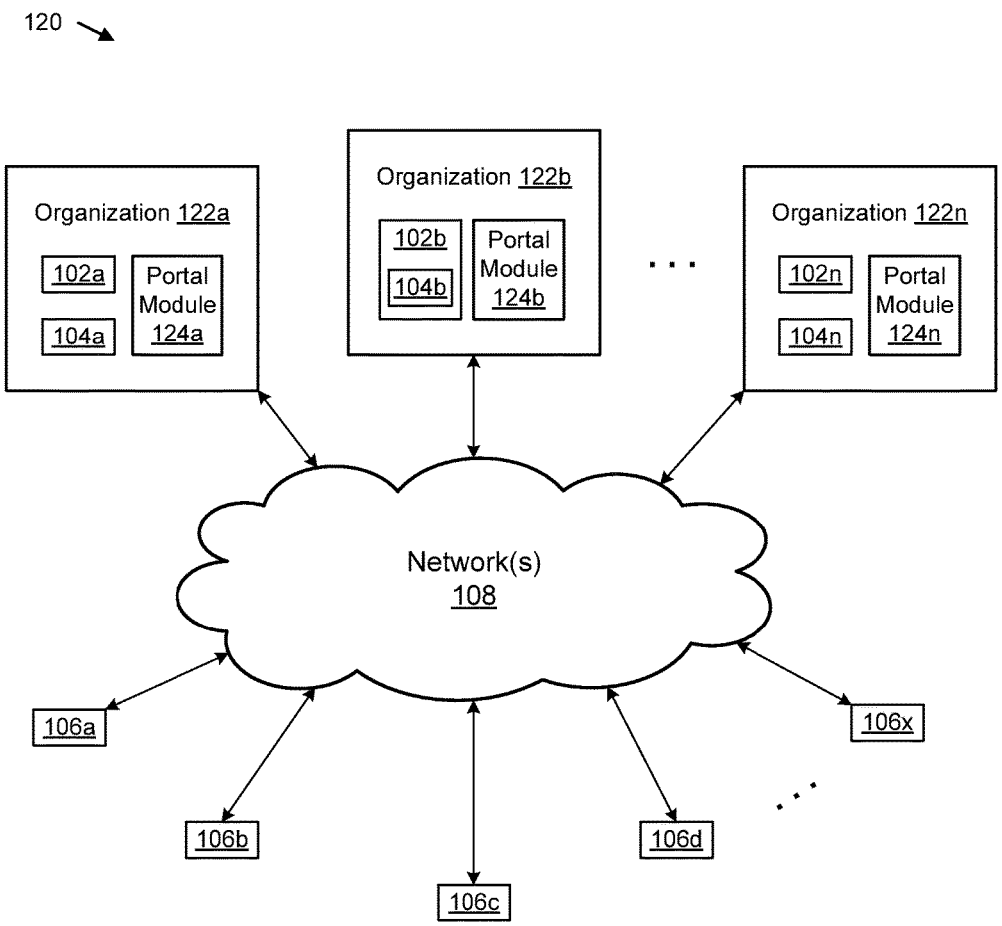
FIG. 1C is a schematic block diagram illustrating a certain embodiment of a system for a dynamic communications controller.

FIG. 1C depicts a certain embodiment of a distributed system 120 of dynamic communications endpoint controllers 104a-n. The system 120, in the depicted embodiment, includes one or more organizations 122a-n, one or more communications devices 106, and one or more communications networks 108. An organization 122a-n, in the depicted embodiment, includes a communications switch 102a-n, an endpoint controller 104a-n, and a portal module 124a-n.

An organization 122a-n, in one embodiment, comprises an entity associated with one or more users or other individuals. An organization 122a-n may comprise a business entity (e.g., a company, a corporation, a partnership), an educational institution, a family or household, a government body, or another type of entity. In the depicted embodiment, each organization 122a-n comprises its own communications switch 102, endpoint controller 104, and portal module 124.

The communications switches 102a-n and/or the endpoint controllers 104a-n may manage communications for the organizations 122a-n substantially as described above with regard to FIG. 1A and FIG. 1B. A communications switch 102a-n, in one embodiment, may receive a communication and/or a communications request for a role in an organization 122a-n, and a role may comprise a pool of one or more members. An endpoint controller 104a-n, in one embodiment, may dynamically select a member of the pool for initiating a session for the communication and/or communications request based on information received from one or more devices 106a-x associated with at least one of the one or more members.

A portal module 124a-n, in one embodiment, may provide information (e.g., a profile page or other webpage) for a role in an organization 122a-n, for one or more communications sessions from an endpoint controller 104a, or the like. Multiple portal modules 124a-n, in certain embodiments, may each provide information from communications sessions, such as profile pages (e.g., for a user, for a role, for a project, for an organization 122, for a fax machine, for a vehicle, for a conference room or other room, or the like), in a decentralized network 120 of multiple organizations 122a-n.

A profile page, in one embodiment, may include information from one or more communications sessions, such as one or more audio/voice call recordings, voice call transcriptions (e.g., speech to text), text messages, emails, video recordings (e.g., from a video conference or chat), images, screenshots, drawings, or other information. A portal module 124a-n, in certain embodiments, is configured to provide a page (e.g., a profile page) associated with a session endpoint 106*a-x* to one or more users, members of a role, or the like. A portal module 124*a-n*, in a further embodiment, may secure and/or limit access to pages, to information on a page, or the like associated with a communications session to one or more users having security authorization for the communications session, in cooperation with the security module 302 described below, or the like.

A portal module 124*a-n*, in cooperation with an endpoint controller 104*a-n* or the like, may seamlessly and/or transparently make the content of an organization's communications (e.g., audio, visual, textual, document, live, non-live) available on its behalf to its agents and/or other users. A portal module 124*a-n* and/or an endpoint controller 104*a-n*, in certain embodiments, may log, record, and/or archive a communication through a privately controlled personal device 106 of a user (e.g., through a secure app or other computer executable code executing as a secure footprint on the personal device 106 or the like).

A portal module 124*a-n*, in one embodiment, may index, parse, or otherwise process information of a communication, so that the information is searchable or otherwise accessible. For example, in certain embodiments, a portal module 124*a-n* may proscriptively merge and/or apply one or more social media communication modalities to communication information, such as adding and/or allowing a user to add one or more hashtags to keywords, allowing a user to "like" a post associated with a communications session, allowing a user to "tag" themselves or other users, roles, resource, an organization 122, or the like, in a post associated with a communications session, allowing a user to edit or add content to a post associated with a communications session, or the like. Because, in one embodiment, a portal module 124*a-n* provides pages independent from other social networks, it provides one or more advantages of social media communication modalities while preserving the professionalism, efficiency, and/or effectiveness of business communications for an organization 122*a-n* with minimal individual disruption and/or interruption.

Each portal module 124*a-n*, in the depicted embodiment, comprises one of a plurality of decentralized portal modules 124*a-n* operating at different geographic locations for different organizations 122*a-n*. In this manner, the plurality of portal modules 124*a-n* may be configured to provide one or more users with access to profile pages for the different organizations 122*a-n*, indexed and accessible by role, with each organization 122*a-n* managing and/or controlling security for its own pages and each portal module 124*a-n* monitoring and publishing communications from its own associated endpoint controller 104.

Figure 2:
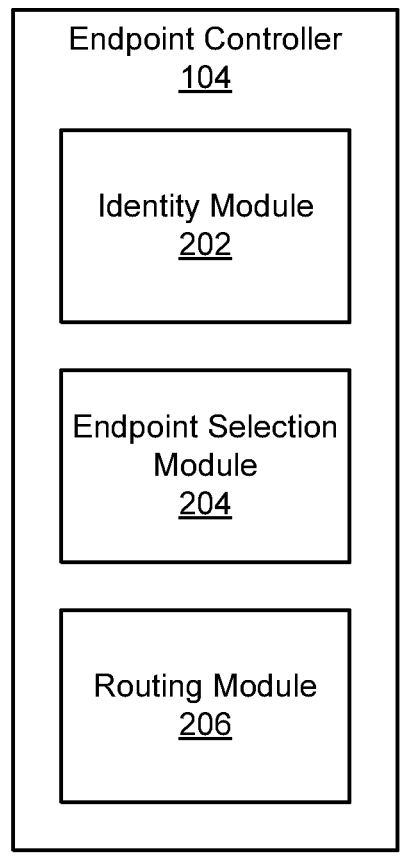
FIG. 2 is a schematic block diagram illustrating one embodiment of an endpoint controller.

FIG. 2 depicts one embodiment of an endpoint controller 104. The endpoint controller 104, in the depicted embodiment, includes an identity module 202, an endpoint selection module 204, and a routing module 206.

In one embodiment, the identity module 202 is configured to masquerade, represent itself (e.g., the endpoint controller 104), and/or register as a session endpoint to a session controller 102 for a communications protocol (e.g., SIP) using one or more network interfaces 108, physical or logical/virtual. For example, in embodiments where the endpoint controller 104 comprises a separate hardware appliance from the communications switch 102, the identity module 202 may masquerade as and/or represent one or more session endpoints over a physical network interface and communications channel 108. In embodiments where the endpoint controller 104 is integrated with the communications switch 102, the identity module 202 may masquerade as and/or represent one or more session endpoints over a logical/virtual network interface, internally within the communications switch 102. In this manner, in certain embodiments, the identity module 202 may allow the endpoint controller 104 to be used with an existing communications switch 102, a third party communications switch 102, or the like (e.g., without modifying, replacing, and/or upgrading the communications switch 102), as the identity module 202 may use a standard and/or predefined procedure for registering as an endpoint, such that the communications switch 102 has no knowledge that the endpoint controller 104 is not the actual endpoint being masqueraded.

For example, in one embodiment, the identity module 202 is configured to directly represent one or more session endpoints using a SIP communication protocol to the communications switch 102, which may comprise one or more of a SIP enterprise session controller (ESC), a SIP local session controller (LSC), a SIP trunk, and/or another external system from the endpoint controller 104. A session endpoint, in certain embodiments, may be associated with a user, a role, a project, a resource, an organization 122, or the like, such as a telephone number, an extension number, a name, an email address, a username, and/or another unique identifier associated with the user, role, project, resource, organization 122, or the like.

In this manner, in one embodiment, an external SIP system and/or device can target a human individual, a user, a role, a project, a resource, an organization 122, or the like as identified by an association with a standard phone number, extension number, or the like. As described below with regard to the endpoint selection module 204 and the outing module 206, although a standard phone number and/or extension number may be used, because the identity module 202 masquerades as the session endpoint, the endpoint selection module 204 may select any destination for a communication, and the routing module 206 may dynamically route a communications session.

A session endpoint, in a further embodiment, represents a human individual, a user, a role, a project, a resource, an organization 122, or the like as identified by a public key certificate, so that an external user, system, and/or device can target the human individual, user, role, project, resource, organization 122, or the like using the public key certificate. A session endpoint, in another embodiment, may be associated with a human individual, a user, a role, a project, a resource, an organization 122, or the like based on a search query presented to a directory (e.g., a Lightweight Directory Access Protocol (LDAP) server or the like) or other data structure, the search query identifying only the human individual, user, role, project, resource, organization 122, or the like.

A session endpoint, in one embodiment, is associated with a role (e.g., a functional role, an organizational role), such as a contact role, a sales role, a customer service role, an administrative role, an executive role, a human resources role, or the like. A role may comprise a pool of multiple associated users (e.g., multiple employees associated with the role). In a further embodiment, a session endpoint represents a resource (e.g., a functional resource, an organizational resource), such as a fax machine, a conference room, a vehicle, or the like. A session endpoint, in certain embodiments, is associated with a project. A project may comprise a name or other identifier, an objective, one or more project members (e.g., one or more roles, one or more users), or the like. A project may be functional and/or organization, and may represent a discrete or ephemeral organizational objective or goal, or the like.

A session endpoint, in one embodiment, is associated with an organization 122's contact role. Ownership of the organization 122's contact role, due to the masquerading of the identity module 202, may remain in full possession and control of the organization 122 even though the routing module 206 described below may be configured to extend a communications session for the contact role onto a user's personally owned device 106 in response to the endpoint selection module 204 selecting the user's personally owned device 106 as the destination, as described below.

While the identity module 202 may masquerade as and/or represent itself as one or more session endpoints, to the communications switch 102, in certain embodiments, one or more actual hardware endpoint devices 106, compatible with the communications protocol described above (e.g., SIP) may register with the endpoint selection module 204 as a destination 106 for a communications session, using the communications protocol. In a further embodiment, the identity module 202 may register with the communications switch 102 (e.g., masquerading as a session endpoint) using a first communications protocol (e.g., SIP), while the one or more destinations 106 (e.g., hardware endpoint devices 106) may use a different communications protocol (e.g., the routing module 206 described below may call or dial a destination 106 to initiate a communication, instead of the destination 106 registering with the endpoint selection module 204 as a SIP endpoint).

In one embodiment, the endpoint selection module 204 is configured to dynamically select a destination 106 for a communication and/or a communications session intended for a session endpoint masqueraded by the identity module 202, as described above. The endpoint selection module 204 may select a destination 106 for a communication and/or communication session based on information from the destination 106 and/or from other potential destinations 106. For example, a session endpoint masqueraded by the identity module 202 may be associated with multiple potential destinations 106 (e.g., multiple users, multiple communications devices, multiple locations, a role, or the like) and, in response to a communications request, the endpoint selection module 204 may query the multiple potential destinations 106, may access information most recently received from the multiple potential destinations 106, or the like to select one or more of the multiple potential destinations 106 for the communication. As described above, a communications session, a communication, or the like may comprise one or more of an audio, text, video, and/or document session.

A session endpoint, in certain embodiments, is associated with a role comprising a pool of multiple associated users. In such embodiments, the endpoint selection module 204 may be configured to select a destination based on information received from one or more devices 106 associated with at least one of the multiple associated users in a pool for a role.

The information that the endpoint selection module 204 receives from a destination, in one embodiment, may include a relative proximity of the destination 106 to a physical station (e.g., a Bluetooth® beacon, a wireless access point, a cell tower, or the like). The endpoint selection module 204 may select a destination 106 based on the received information and one or more predefined rules or selection criteria, such as selecting a destination 106 which is closest to the physical station, a destination 106 which is furthest away from the physical station, or the like. For example, the endpoint selection module 204 may receive information from the mobile phones or other personal devices 106 of a plurality of users (e.g., members of a pool for a role), from a physical station, or the like.

In a further embodiment, the information that the endpoint selection module 204 receives from one or more destinations 106 includes a geographic location of a destination 106, such as a latitude and a longitude, a determined street address, or another indicator of a geographical location, determined from a GPS sensor at the destination 106, determined based on cell tower and/or Wi-Fi accessibility or triangulation, or otherwise determined from a destination 106 (e.g., a mobile phone or other personal device 106 of a user). The endpoint selection module 204 may be configured to select a destination 106 from a plurality of destinations 106 in response to the geographic location of the selected destination 106 being physically located within a predetermined site's geographic boundaries, such as within a predefined building; within a predefined room; within a predefined state, county, city, district, city block; and/or within another predefined geographical region.

The information that the endpoint selection module 204 receives from one or more destinations 106, in certain embodiments, may comprise a current availability of one or more users. For example, the endpoint selection module 204 may receive information from a mobile phone or other personal device 106 of a user, indicating a current availability of the user, such as whether the user is currently on a phone call, how recently the user has used the phone, a current activity or state of the user (e.g., an application or type of application being used on the device 106; a current level of ambient noise and/or lack of other voices measured using a microphone of the device 106; a physical and/or fitness activity of the user such as walking, running, cycling determined using a gyroscope, an accelerometer, or other sensor of the device 106 and/or from an activity tracker device; or the like).

In a further embodiment, the endpoint selection module 204 may determine an availability of a user based on information from an activity tracker device, which may measure and/or determine a physical and/or fitness activity of the user such as walking, running, cycling, or the like, a number of steps, a heart rate, a caloric intake, or the like. Examples of activity tracker devices, in various embodiments, may include a smart watch, a smart band and/or fitness band, a fitness necklace and/or pendant, or another wearable device with one or more sensors (e.g., a gyroscope, an accelerometer, a heart rate sensor, a GPS sensor, or the like). The endpoint selection module 204 may select a destination 106 with a most available user, with a first available user, or the like based on the received information, selecting a user with a requested role that is currently available to accept the communications session (e.g. not exercising, not dining or eating, or the like), based on information received from a user's personal mobile device 106, from a user's activity tracker device (e.g., directly from an activity tracker device, from a mobile telephone paired to an activity tracker device, or the like).

In certain embodiments, the endpoint selection module 204 may determine an availability of a user and/or a destination 106 based on information indicating a proximity of the user and/or destination 106 (e.g., a user's mobile phone or other personal device 106) to an activity station, such as a meeting room, a surgery or operation room, or the like. The endpoint selection module 204 may select a user and/or another destination 106 (e.g., a member of a pool of users for a role) that is not currently located within a predefined activity station, within a predefined distance of an activity station, or the like (e.g. a user that is not in a meeting, not in surgery). The endpoint selection module 204, in one embodiment, may select a fallback destination 106, such as a receptionist, secretary, front desk, assistant, on-call user, or another fallback, in response to one or more other users and/or destinations 106 being busy, unavailable, at a predefined activity station, or the like.

In one embodiment the endpoint selection module 204 may be configured to determine an availability of a user and/or another destination 106 (e.g., in order to select a destination 106 for a communication) based on information indicating a network 108 to which the destination device 106 is connected, such as a LAN, a wireless network, a virtual private network (VPN), or the like. For example, the presence of a user and/or a user's device 106 on an organization 122's network 108 may indicate that the user is present and/or ready to receive communications for the user, for a role associated with the user, and/or for the organization 122.

The endpoint selection module 204, in certain embodiments, may be configured to determine an availability of a user and/or a destination 106 (e.g., in order to select a destination 106 for a communication) based on information indicating a current speed and/or velocity of a user and/or of a user's personal mobile device 106. For example, a user's personal mobile device 106 may comprise a GPS sensor, an accelerometer, a compass, or the like, data/information from which the mobile device 106 and/or the endpoint selection module 204 may use to determine a velocity, a speed, a direction of travel, or the like. The endpoint selection module 204, in one embodiment, may select a user or other destination 106 based on a velocity, a speed, and/or a direction of travel for the user. For example, the endpoint selection module 204 may select a user and/or a user's personal mobile device 106 as a destination 106 for a communication in response to a velocity and/or speed of the user and/or mobile device 106 being less than a predefined threshold (e.g., a walking speed), indicating that the user is not in vehicular transit, is walking, or the like.

In a further embodiment, the endpoint selection module 204 may use a speed and/or velocity in connection with other information. For example, in one embodiment, the endpoint selection module 204 may allow a user to be selected, even if the user's velocity is greater than the predefined threshold, if additional information indicates that the user is a passenger and not a driver, that the user is riding public transportation, or other information indicating that the user is not operating a vehicle, despite a determined velocity and/or speed. For example, the endpoint selection module 204 and/or a user's personal mobile device 106 may determine the personal mobile device's relative location to other mobile devices within a vehicle (e.g., using GPS data, based on relative transmission signal strengths of the other mobile devices, by triangulating signal sources, or the like) and may allow the user and/or the user's personal mobile device 106 to be selected as a destination 106 for a communication in response to determining that the user is not located in a position to be driving and/or operating a vehicle.

In a further embodiment, the endpoint selection module 204 may determine and/or infer that a user is operating a vehicle in response to determining that a velocity and/or speed of the user satisfies and/or exceeds a predefined threshold and also detecting no other mobile devices within a predefined proximity with substantially similar velocity, speed, and/or direction, or the like. In another embodiment, the endpoint selection module 204 may determine and/or infer that a user is operating a vehicle in response to determining that the user's personal mobile device 106 is in a driver's seat position (e.g., a forward leftmost or rightmost mobile device, depending on local law and/or customs defining the side of the road customarily travelled on in the country or other region in which the user is located) within a set or collection of multiple mobile devices (e.g., a group of mobile devices within a predefined distance of each other and having a substantially similar velocity, speed, and/or direction).

As described above, the information which the endpoint selection module 204 receives from the one or more destinations 106, based upon which the endpoint selection module 204 may select a destination 106, may include one or more of an indicator of whether a destination 106 is currently engaged in a different communication and/or communications session, a proximity of a destination 106 to a predefined location (e.g., a geographic location; an activity station; a physical station such as a Bluetooth® beacon, a wireless access point, and/or a cell tower; or the like), a current network connection associated with a destination 106, an indicator of a level of ambient noise detected from a microphone of the destination 106, activity data for a user associated with the destination 106 from a wearable activity tracker device of the user, a current velocity associated with a destination 106, the absence of other destination devices 106 in proximity to a destination 106 with equivalent direction and velocity, and/or a previous session connectivity history of a destination 106 (e.g., whether a user initiating the communication has communicated with the destination 106 previously, a number of times a user initiating the communication has communicated with the destination 106, a most recent or the like).

As described below with regard to the security module 302, a destination 106 may comprise a secure footprint executing on a personally owned device 106 of a user. The information from the destination 106 that the endpoint selection module 204 receives, in certain embodiments, may be sent from the secure footprint executing on the device 106. In response to a change in a role assignment for a user, the endpoint selection module 204 selecting a user for a communication, or another trigger, the security module 302, in certain embodiments, may prompt the user (e.g., on a personal mobile device 106 of the user) to accept the role, to accept the communication, to confirm a change in status, to confirm information being sent to the endpoint selection module 204, or the like. If the user denies and/or cancels the prompt, in one embodiment, the endpoint selection module 204 may select a different destination 106 for the communication.

The endpoint selection module 204, in certain embodiments, may improve performance of individual users (e.g., employees or other members of an organization 122) by automatically detecting the activities of the individual users, and dynamically selecting a user/destination 106 for a communication based on the detected activities or other information, so that an optimal user/destination 106 is selected. While the endpoint selection module 204, in certain embodiments, may select one destination 106 from multiple potential destinations 106 for a communication, based on information from one or more of the destinations 106, in a further embodiment, may determine a mode of communication based on information received from one or more destinations 106. For example, the endpoint selection module 204 may dynamically determine whether a communication should be routed as a voice call, as a voicemail, as voice transcribed to a text message, to a subordinate or other destination 106, and/or another mode of communication, based on information from one or more destinations 106, as described above. In a further embodiment, the endpoint selection module 204 may select both a destination for a communications request and a mode of communication for the communications request based on information from one or more destinations 106.

As described below with regard to the hierarchy module 304, in certain embodiments, the endpoint selection module 204 may cooperate with the hierarchy module 304, to select a destination 106 based at least in part on a hierarchy of users, roles, and/or destinations 106. For example, the endpoint selection module 204 may favor and/or select a principal role and/or individual whenever the role and/or individual is available for a communication, is a member of a collection of roles and/or individuals being considered for session connectivity, or the like. In a further embodiment, the hierarchy module 304 may be configured to allow a user that requests or otherwise originates a communication to escalate the endpoint selection module 204's selection for the communication to a destination 106 with a higher authority in the hierarchy and/or to deescalate the endpoint selection module 204's selection for the communication to a destination 106 with a lower authority in the hierarchy. In another embodiment, the hierarchy module 304 may allow a user at a destination 106, which receives a communication, to escalate and/or deescalate the endpoint selection module 204's selection for the communication to another user/destination 106 in the hierarchy, and the routing module 206 may transfer the communication accordingly.

In certain embodiments, if a session originator (e.g., a user that requests a communication) retries an ignored communication (e.g., within a predefined time period or the like), the endpoint selection module 204 and/or the hierarchy module 304 increase an urgency of the retried communication. For example, the endpoint selection module 204 may select a destination 106 with a higher position in the hierarchy for a retried communication, may select a different communication mode for a retried communication (e.g., selecting a voice call instead of a voicemail for the retried communication), and/or otherwise adjust handling of a retried communication to increase urgency.

In one embodiment, the routing module 206 maintains and/or directs connectivity for a communication and/or a communications session with at least one destination 106 selected by the endpoint selection module 204, using one or more of the communications protocols described above (e.g., SIP), or the like. The routing module 206 may make an initial connection, sending, routing, and/or forwarding a communications request and/or a communication itself to a selected destination 106. The routing module 206, in this manner, may use an established communications session to spawn and/or transfer one or more live or non-live communications, such as, voice/audio, text, video, documents, or the like.

In certain embodiments, the routing module 206 is configured to transfer an ongoing communications session (e.g., a phone call, a video conference) from one destination 106 to another destination 106, in response to a user (e.g., a participant in the communications session) requesting a transfer, by pressing a predefined button or key, or combination of buttons or keys; by selecting a transfer function in an application (e.g., computer executable program code) executing on a destination device 106 (e.g., a secure footprint); or the like.

In one embodiment, a user (e.g., a participant in the communication session) provides an alternate identifier for the new destination 106 for the transfer, such as a telephone number, an extension number, a name, a username, an email address, or the like. In a further embodiment, the endpoint selection module 204 may dynamically select the new destination 106 for the routing module 206 to transfer a communication, in the manner described above based on information from the alternate destination 106. In another embodiment, the hierarchy module 304 described below may select a new destination 106 for the routing module 206 to transfer a communication, such as an available destination 106 in a different level of a hierarchical tree (e.g., a user may escalate or deescalate a communication to a different level of the hierarchical tree).

In certain embodiments, the security module 302 authenticates a user and/or a destination 106 for a transfer by the routing nodule 206 as described below. The routing module 206 and/or the security module 302, in one embodiment, may transfer a communication and/or communications session to an unauthenticated guest destination 106 known to or otherwise authorized by the transferring user and/or the currently selected destination 106. The routing module 206 may allow a user to transfer a communication and/or communications session from a currently selected destination device 106 to another destination device 106 detected within a certain proximity of the currently selected destination device 106 (e.g., on the same network 108 as the currently selected destination device 106, within Wi-Fi®, Bluetooth®, and/or near field communication (NFC) range of the currently selected destination device 106, or the like).

In this manner, in certain embodiments, the routing module 206 may allow a user to place their mobile phone 106 against or near another mobile phone 106 to transfer a communication using NFC to negotiate the session transfer; to select a television or set top box as a new destination 106 to cast, stream, or otherwise transfer a communication; or the like, facilitating convenience and/or more public communication. In one embodiment, the routing module 206 may transfer a communication and/or communications session using a function and/or protocol of one or more of the communication protocols described above (e.g., SIP).

The routing module 206, in certain embodiments, may cooperate with the security module 302 to authorize and/or authenticate a transfer (e.g., authenticating a password, personal identification number (PIN), fingerprint, facial recognition, or the like of a user). In a further embodiment, the routing module 206 may rely on a previously authenticated user (e.g., already authenticated by the security module 302, a member of a list of trusted users, or the like) to select an unauthenticated guest destination, without further authentication by the security module 302.

For example, a user and/or destination device 106 already authenticated to the security module 302 and/or the endpoint controller 104, may be authorized to transfer a communications session to an unauthenticated guest device 106 known to the authenticated user and/or destination device 106 using the routing module 206 without further authentication by the security module 302. The routing module 206, in one embodiment, may cooperate with the security module 302 to add a guest destination 106 to a list of known and/or authorized destinations 106 (e.g., which the security module 302 is not required to authenticate for future communications, or the like), in response to a user selecting the guest destination 106 for transferring a communication, or the like.

In certain embodiments, the routing module 206 may be configured to transcode and/or convert a communication session into a different format and/or mode of communication for transferring the communication session, based on a preference and/or compatibility of the new destination 106.

For example, some destinations 106 may support video while others may not, or may support different formats of video and/or audio. A recipient of a communication may have a preference for text, while an originator of the communication may have a preference for voice, or vice versa. In certain embodiments, the routing module 206 may transcribe audio into text or vice versa (e.g., convert text to audio) with little or no delay to the communication. The routing module 206, in certain embodiments, may store and/or maintain a table, a list, or another data structure defining one or more preferences (e.g., based on user input), compatibilities, or the like and may transcode or convert a communications session based on the one or more preferences, compatibilities, or the like in response to transferring the communications session to a different destination 106.

Figure 3:
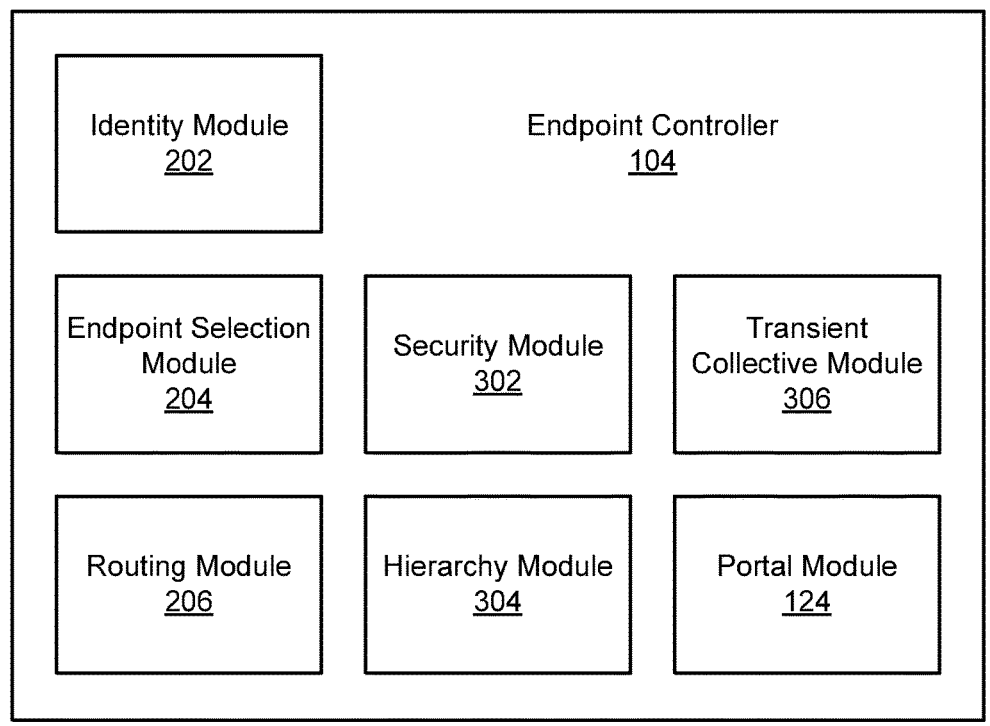
FIG. 3 is a schematic block diagram illustrating a further embodiment of an endpoint controller.

FIG. 3 depicts a further embodiment of an endpoint controller 104. The endpoint controller 104, in the depicted embodiment, includes an identity module 202, an endpoint selection module 204, and a routing module 206, which may be substantially similar to those described above, and further includes a security module 302, a hierarchy module 304, a transient collective module 306, and a portal module 124.

In one embodiment, the security module 302 is configured to prevent unauthorized access to communications, to a user and/or an organization 122's data (e.g., being transferred over a network 108, residing on a user's personal mobile device 106 and/or other destination device 106, stored and/or provided by a portal module 124, or the like). In this manner, in certain embodiments, the security module 302 may allow a user's personally owned mobile device 106 to securely be used for an organization 122's communications, without intermingling personal data with the organization 122's data, or the like.

In one embodiment, a communications request to initiate a new communications session may include and/or reference a public key certificate identifying a user (e.g., an individual, an employee), a role, an organization 122, or the like associated with a session endpoint masqueraded and/or represented by the identity module 202. The security module 302, in one embodiment, may validate the public key certificate using Web of Trust (WOT) association rules, may check a designated revoker to ensure that the WOT public key certificate has not been revoked, or the like. In a further embodiment, the security module 302 may validate the public key certificate using public-key infrastructure PKI rules with trusted roots from one or more certificate authorities (CAs), may check a CA's certificate revocation list (CRL) to ensure that the PKI public key certificate has not been revoked, or the like.

In certain embodiments, the security module 302 may authenticate a destination 106 (e.g., a software or hardware SIP endpoint, or the like). For example, the security module 302 may validate and/or authenticate a username or other unique identifier and a password in response to a destination 106 registering with the endpoint selection module 204 to receive one or more communications. In a further embodiment, the security module 302 may validate and/or authenticate a public key certificate for a destination 106 registering with the endpoint selection module 204 to receive one or more communications. In one embodiment, the security module 302 may validate the public key certificate of the destination 106 using Web of Trust (WOT) association rules, may check a designated revoker to ensure that the WOT public key certificate has not been revoked, or the like. In a further embodiment, the security module 302 may validate the public key certificate of the destination 106 using public-key infrastructure PKI rules with trusted roots from one or more certificate authorities (CAs), may check a CA's certificate revocation list (CRL) to ensure that the PKI public key certificate has not been revoked, or the like.

Without exchanging an endpoint 106's private credentials, the security module 302 may validate that the endpoint 106 requesting authorization has access to the endpoint 106's private key or credentials through a challenge response where the security module 302 issues a token for the endpoint 106 to modify with the endpoint 106's private key or credentials and return the modified response. The security module 302 may then verify that the modified response was accomplished by the endpoint 106's access to a valid private key or credentials and if so, allow the requested authorization.

In certain embodiments, at least a portion of the security module 302 may be disposed on a destination device 106, as an application or other computer executable code, an ASIC, an FPGA or other programmable logic, and/or another secure footprint on a destination device 106. The security module 302 may generate a WOT public key certificate, a PKI public key certificate, or another digital certificate or identity certificate from a destination device 106 itself, either for the destination device 106 or for a user, role, organization 122, or other entity associated with the destination device 106.

The security module 302, in one embodiment, may distribute the generated certificate to a security authority (e.g., an organization 122's security authority) and the security authority may return the generated certificate signed, along with the associated trusted root. At least a portion of the security module 302 disposed on the endpoint controller 104 (e.g., as an application or other computer executable code, an ASIC, an FPGA or other programmable logic, or the like on the endpoint controller 104) may authenticate a destination device 106 attempting to register with the endpoint selection module 204 by challenging the destination device 106's access to a private key associated with a public key certificate for an associated identity distributed from a trusted entity (e.g., an organization 122's trusted LDAP server or the like).

The security module 302, in certain embodiments, may use a reverse domain name service (DNS) lookup to authenticate an originator (e.g., an entity requesting a communications session), as a secondary authentication source to increase a confidence in the originator's trust and credentials for a communications session, or the like. For example, the security module 302 may provide a confidence metric (e.g., a trust rating or score) to the endpoint selection module 204, based on a reverse DNS lookup or the like, and the endpoint selection module 204 may use the confidence metric to select a destination 106 for a communication, to determine a communication mode or action for a communication (e.g., how a requested session should be handled; placed to an individual, screened, forwarded to voicemail, transcribed to a text message, blocked, or the like).

An authentication exchange between the security module 302 and either an initiator of a communications session or a destination 106, in certain embodiments, may be conducted via a secure connection, such as internet protocol security (IPSEC), transport layer security (TLS), secure sockets layer (SSL), secure shell (SSH), and/or another secure IP technology. As described above with regard to the routing module 206, in certain embodiments, the security module 302 may allow the transfer of a communications session to a guest destination device 106. In one embodiment, the security module 302 may authenticate the guest destination device 106. In a further embodiment, the security module 302 may allow the routing module 206 to transfer a communications session to an unauthenticated guest destination device 106.

The security module 302 may add a guest destination device 106 to a table, list, or other data structure of trusted devices, in response to a user transferring a communications session to the guest destination device 106. In one embodiment, the security module 302 may maintain one or more blocklists and/or passlists for different individuals, users, roles, or the like. The one or more blocklists and/or passlists, in certain embodiments, may be fine grained, with associations between communication originators (e.g., by phone number, extension number, name, username, email address, or other unique identifier) and actions (e.g., primary, secondary, and/or tertiary actions). A primary action may comprise an immediate answer, an ignored no-answer, an immediate block, an immediate send to voicemail, or the like. A secondary action may comprise always ignoring, always sending to voicemail, always blocking. A tertiary action may comprise one or more conditions, such as time, place, or activity (e.g., always block or send to voicemail while driving, after work hours, while at home or another geographic location, or the like). The security module 302 may determine one or more actions to associate with a communication originator by prompting a user from a destination device 106, by monitoring and/or detecting a user's actions, by accessing and/or analyzing a session connectivity history of the user with one or more communication originators and/or other historical behavior of the user, or the like.

The security module 302, in one embodiment, may be configured to prevent unauthorized access to an organization 122's data residing on a user's personally owned device 106, from one or more communications sessions or the like (e.g., audio recordings, video recordings, audio and/or video transcriptions, text messages, documents, call or communication history, or the like). For example, the security module 302 may encrypt the data, authenticate a user attempting to access the data, or the like. The security module 202, in one embodiment, may store, copy, and/or move an organization 122's data at a different storage location owned by and/or in control of the organization, such as storage of the endpoint controller 104 and/or of a portal module 124, a server or storage device of the organization 122, or the like. In a further embodiment, the security module 302 may be configured to remove an organization 122's data from a user's personally owned device 106 in response to a trigger, such as a request from the organization 122, a request from the owner of the personal device 106, a revocation of a WOT or PKI certificate, removal of the association that originally granted access such as being included and later removed from an organization 122's role or project, a predefined number of failed authentication requests by a user, or the like.

In this manner, in certain embodiments, the security module 302 is configured to protect ownership and privacy of the user's personally owned device 106 while the user's personally owned device 106 may be used as a destination 106 for communications by an organization 122 for the organization 122's purposes. By dynamically routing communications through the endpoint controller 104 (e.g., by role, by location, and/or by other information from a destination 106), in a man-in-the-middle configuration, in certain embodiments, ownership of an organization 122's contact role, contact address (e.g., phone number, email address, extension number) may remain in full possession and control of the owning organization 122, even though the communication session (e.g., for a role) can be extended onto an individual's personal and private devices 106.

In one embodiment, the hierarchy module 304 is configured to determine (e.g., store, access, maintain) a hierarchical tree for an organization 122. A hierarchical tree for an organization 122 may comprise a hierarchy of destinations 106 associated with roles of individuals within an organization 122. For example, a hierarchical tree for an organization 122 may be organized based on a management structure for the organization 122, based on different customer service levels for the organization 122, based on a department structure for the organization 122, based upon geographical locations, or the like. The endpoint selection module 204, as described above, may be configured to select a destination 106, at least in part, based on a role associated with a masqueraded session endpoint and on a position of the selected destination 106 within the hierarchical tree.

For example, for certain communications (e.g., certain communication types, communications from certain originators or sources, or the like), the endpoint selection module 204 may be configured to select a destination 106 from a lowest level of a hierarchical tree, and a user may escalate the communication to one or more higher levels as described above with regard to the routing module 206, if desired. For other communications (e.g., potentially sensitive or private communications, high priority communications, or the like), the endpoint selection module 204 may be configured to select a destination 106 from a highest level of a hierarchical tree, and a user may deescalate the communication to one or more lower levels as described above with regard to the routing module 206, if desired.

The hierarchy module 304, in one embodiment, may mark a role and/or destination 106 as preferred and/or favored, such that the endpoint selection module 204 selects a member of the role and/or the destination 106 over others when available for a communication. In certain embodiments, the hierarchy module 304 may be configured to build and/or import a hierarchical tree from a trusted source for an organization 122, such as an LDAP server or the like for the organization 122. In a further embodiment, the hierarchy module 304 may determine a hierarchical tree for an organization 122 based on input from a user such as an administrator or the like. Based on a hierarchical tree from the hierarchy module 304, in certain embodiments, the endpoint selection module 204 may dynamically delegate a communication for a user and/or role to a subordinate defined by the hierarchical tree, in response to determining that the user and/or role members are busy or unavailable.

In a further embodiment, the endpoint selection module 204, in cooperation with the hierarchy module 304 or the like, may divert a communication to the furthest and/or lowest level of a hierarchical tree (e.g., a lowest available subordinate), and the routing module 206 may allow the communication to be escalated/promoted to a higher level (e.g., a supervisor/manager), if desired. Similarly, in certain embodiments, the endpoint selection module 204, in cooperation with the hierarchy module 304 or the like, may divert a communication to the closest and/or highest level of a hierarchical tree, and the routing module 206 may allow the communication to be deescalated/demoted to a lower level (e.g., a subordinate), if desired. The endpoint selection module 204, in one embodiment, may increase an urgency of a communication, escalating/promoting the communication to a higher level in a hierarchical tree from the hierarchy module 304, in response to the communication comprising a second or subsequent retried communication from a communication originator, after one or more ignored and/or failed communication requests from the communication originator.

In one embodiment, the transient collective module 306 is configured to determine current members of a transient collective group and/or to determine addresses (e.g., phone numbers, extension numbers, email addresses, names, usernames, or other identifiers) of current members of a transient collective group, so that the endpoint selection module 204 may select one or more of the determined current members of the transient collective group as destinations 106 for a communication session and the routing module 206 may maintain and/or direct connectivity for the communication session to the one or more of the determined current member of the transient collective group. A transient collective group, in certain embodiments, includes a plurality of members having one or more characteristics in common, such as a location, a mode of transportation, an activity, or the like. Members of a transient collective group may change over time, as characteristics for the members change.

Examples of transient collective groups, in various embodiments, may include passengers on an airplane, ship, bus, train, or the like; students in the same class, enrolled in the same school, and/or on the same campus; residents of a neighborhood, city, zip code, or other region; shoppers in a store; employees of an organization 122; employees of an organization 122 currently onsite; users on a network; or the like. The transient collective module 306 may maintain a table, a list, and/or another data structure tracking members of a transient collective. For example, the transient collective module 306 may add cruise ship passengers, or members of another transient collective, to a transient collective list or other data structure as they board and connect to the ship's Wi-Fi networks, or the like. Once the transient collective module 306 has added the members to the transient collective, the members may continue to be addressable as a session endpoint on their personal communication devices 106 (e.g., over off-ship cellular networks or off-ship internet addressable networks, in the cruise ship example).

In one embodiment, the identity module 202 masquerades as or represents a single session endpoint for a transient collective to a session controller of a communications switch 102, multiple session endpoints for different subsets of a transient collective, or the like. The endpoint selection module 204 may select multiple members (e.g., each current member, each available member) of the transient collective as destinations 106 for communications for the transient collective, based on the table, list, and/or other data structure identifying members of the transient collective from the transient collective module 306, and the routing module 206 may route and/or send the communications to the multiple members of the transient collective. In certain embodiments, for example, school campuses, municipalities, or other administrative entities may target an emergency message or announcement, such as a reverse 911 message or the like, to the subset of a transient collective currently within an emergency area, or the like.

In certain embodiments, one or more subsets of a transient collective group (e.g., individual, full, or partial transient collectives) may be addressed for a communication (e.g., each subset may be masqueraded and/or represented by the identity module 202). For example, in an embodiment where a transient collective comprises passengers of a cruise ship, those not yet on board the cruise ship may be targeted (e.g., as determined by lack of connectivity to the ship's Wi-Fi or the like) with a text message alerting them of the imminent departure of the ship from port, requesting that they board as soon as possible, or the like. The transient collective module 306, in certain embodiments, may monitor and/or update membership in a transient collective as the membership changes. At the end of a cruise, for example, the transient collective module 306 may purge and/or clear the transient collective of passengers, create a new transient collective with new passengers, or the like.

FIG. 4A depicts one embodiment of a destination 400. The destination 400, in the depicted embodiment, comprises a vehicle 402. In response to a communication request, such as a phone call, video call, text message, email, or the like, for a session endpoint associated with one or more of the users 404a, 404b (e.g., passengers in the vehicle 402, members of a work crew, members of a family, members of a pool for a role), the endpoint selection module 204 may query one or more endpoint devices 106a, 106b associated with the one or more users 404a, 404b for information, such as location information; velocity, speed, relative position, and/or direction information; or the like.

Based on the received information, the endpoint selection module 204 may determine that the users 404a, 404b and associated endpoint devices 106a, 106b are located in the same vehicle 402; that a first user 404a and associated endpoint device 106a are located in a driver's position; or the like. The endpoint selection module 204 may select each of the passenger users 404b and/or associated endpoint devices 106b for the communication (e.g., not the driver 404a); may select one or more passenger users 404b based on a hierarchical tree from the hierarchy module 304; or the like.

FIG. 4B depicts a further embodiment of a destination 410. The endpoint selection module 204, in one embodiment, may determine that a first user 404a associated with a role is stationary, walking, or the like, and is therefore available for a communication based on information from the first user 404a's mobile communications device 106a. The endpoint selection module 204, in a further embodiment, may determine that a second user 404b associated with the same role is riding a bicycle and is therefore unavailable for the communication based on information from the second user 404b's mobile communications device 404b (e.g., a mobile telephone, an activity tracker, or the like). The endpoint selection module 204 may select the first user 404a and/or the associated mobile communications device 106a as a destination for the communication based on the different information received from the devices 106a, 106b indicating the availability of the first user 404a and the unavailability of the second user 404b.

FIG. 4C depicts another embodiment of a destination 420. The destination 420, in the depicted embodiment, comprises a building 424 with multiple physical stations 422a, 422b, such as a Bluetooth® beacon, a wireless access point (e.g., a Wi-Fi® router, a cell tower), or the like. Different physical stations 422a, 422b may be associated with different roles, or the like. For example, different departments of an organization 122 may be located on different floors of the building 424 and may therefore be closer to different physical stations 422a, 422b.

The endpoint selection module 204, in certain embodiments, may receive information from one or more endpoint devices 106a-c and/or from the physical stations 422a, 422b themselves, indicating which users 404a-c and/or devices 106a-c are closest to which physical stations 422a, 422b. The endpoint selection module 204 may select a user 404a and/or device 106a closest to a first physical station 422a for a communication for a role associated with the first physical station 422a and may select a second user 404b and/or device 106b closest to a second physical station 422b for a communication for a role associated with the second station 422b, or the like.

FIG. 4D depicts a certain embodiment of a destination 430. The destination 430, in the depicted embodiment, comprises a hospital 432 or the like, with an activity station 434 comprising an operating room. The endpoint selection module 204, in one embodiment, determines that a first user 404b (e.g., a doctor and/or surgeon) is within the activity station 434, performing surgery or the like, based on information from a mobile device 106b associated with the first user 404b. In response to determining that the first user 404b is within the activity station 434, the endpoint selection module 204 may select a second user 404a and/or device 106a for a communication, since the second user 404a is at a desk 436 outside of the activity station 434, and is therefore available for the communication.

Figure 5:
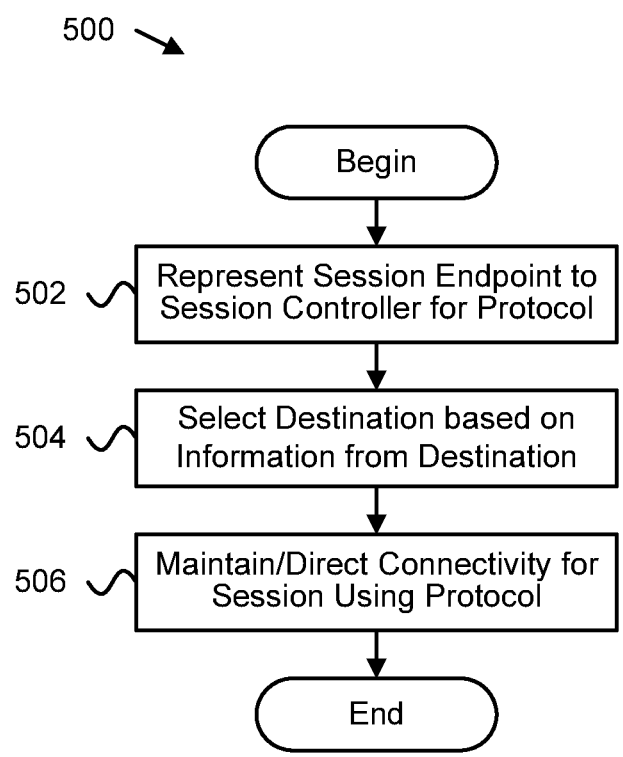
FIG. 5 is a schematic flow chart diagram illustrating one embodiment of a method for a dynamic communications controller.

FIG. 5 depicts one embodiment of a method 500 for a dynamic communications endpoint controller 104. The method 500 begins, and the identity module 202 represents 502 and/or masquerades 502 as a session endpoint to a session controller 102 for a communications protocol, using one or more network interfaces. The endpoint selection module 204 dynamically selects 504 a destination 106 for a session intended for the represented 502 and/or masqueraded 502 session endpoint based on information from the selected 504 destination 106. A routing module 206 maintains 506 and/or directs 506 connectivity for the session with at least the selected 504 destination 106 using the communications protocol and the method 500 ends.

Figure 6:
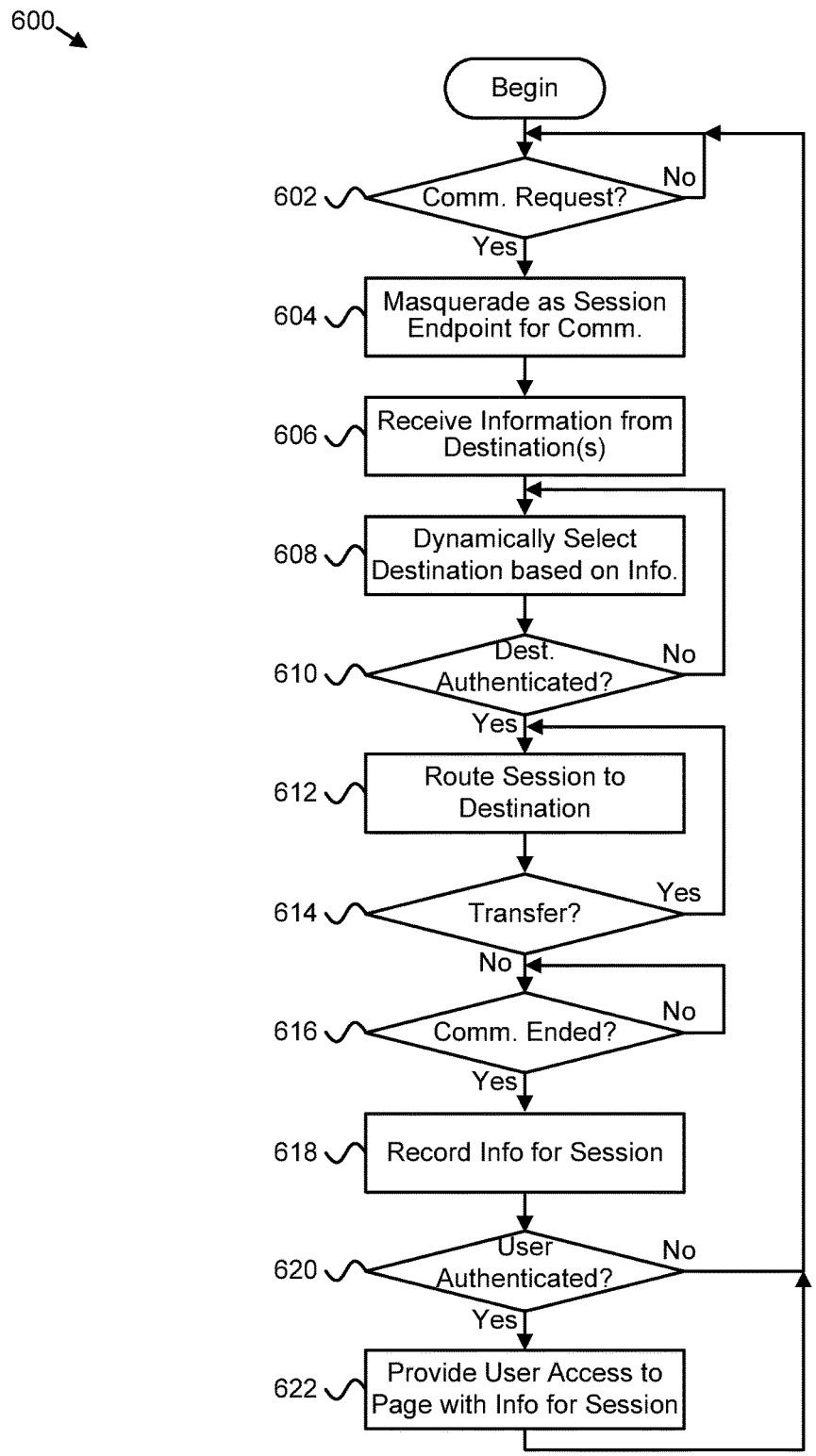
FIG. 6 is a schematic flow chart diagram illustrating a further embodiment of a method for a dynamic communications controller.

FIG. 6 depicts a further embodiment of a method 600 for a dynamic communications endpoint controller 104. The communications switch 102 (e.g., a session controller of the communications switch 102) determines 602 whether a communications request has been received. The identity module 202 masquerades 604 as a session endpoint for the requested 602 communication. The endpoint selection module 204 receives 606 information from one or more destinations 106 and dynamically selects 608 a destination 106 for the requested 602 communication based on the received 606 information.

The security module 302 determines 610 whether the selected 608 destination 106 is properly authenticated. If the selected 608 destination 106 cannot be properly authenticated 610, the endpoint selection module 204 selects 608 a new destination 106 based on the received 606 information until a selected 608 destination 106 is properly authenticated 610. In certain embodiments, if the security module 302 is unable to authenticate any destination 106, the portal module 124 may be configured to record the communication and a targeted destination 106 may retrieve the recorded communication at a later time once the destination 106 is authenticated.

The routing module 206 routes 612 the requested 602 communications session to the selected 608 and authenticated 610 destination 106. In response to the routing module 206 detecting 614 a transfer request or other trigger, the routing module 206 routes 612 the communications session to a new destination 106.

In response to the communications session ending 616, the portal module 124 records 618 information for the communications session, including, in certain embodiments, transcription of audio. In response to the security module 302 authenticating 620 a user, the portal module 124 provides 622 the user access to a page with information for the communications session and the method 600 continues for a subsequently received 602 communications request.

A means for receiving a communication, a communications request, or the like for a role in an organization 122 comprising a pool of one or more members, in various embodiments, may include a communications switch 102, an endpoint controller 104, a network 108, a destination 106, a mobile communications device 106, a routing module 206, a hardware network appliance, a network adapter, a processor, an integrated circuit device (e.g., an ASIC, an FPGA or other programmable logic, or the like), or other logic hardware and/or other executable code stored on a computer readable storage medium. Other embodiments may include similar or equivalent means for receiving a communication, a communications request, or the like for a role in an organization 122.

A means for dynamically selecting a member of a pool for initiating a session for a communication, a communications request, or the like based on information received from one or more devices 106 associated with at least one member of the pool, in various embodiments, may include a communications switch 102, an endpoint controller 104, a mobile communications device 106, an endpoint selection module 204, a routing module 206, a transient collective module 306, a hardware network appliance, a processor, an integrated circuit device (e.g., an ASIC, an FPGA or other programmable logic, or the like), or other logic hardware and/or other executable code stored on a computer readable storage medium. Other embodiments may include similar or equivalent means for dynamically selecting a member of a pool for initiating a session.

A means for providing a profile page for a role in an organization 122 in a decentralized network 120 of multiple organizations 122a-n with information from a session for a communication, communications request, or the like, in various embodiments, may include a communications switch 102, an endpoint controller 104, a mobile communications device 106, a portal module 124, a hardware network appliance, a server, a processor, an integrated circuit device (e.g., an ASIC, an FPGA or other programmable logic, or the like), or other logic hardware and/or other executable code stored on a computer readable storage medium. Other embodiments may include similar or equivalent means for means for providing a profile page for a role in an organization 122 in a decentralized network 120 of multiple organizations 122a-n.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
an identity module configured to masquerade as a session endpoint to a session controller for a communications protocol using one or more network interfaces;
a hierarchy module configured to determine a tree for an organization, the tree comprising a hierarchy of destinations associated with roles of individuals within the organization;
an endpoint selection module configured to dynamically select a destination from the hierarchy of destinations for a session intended for the masqueraded session endpoint based on information from the selected destination, on a role associated with the masqueraded session endpoint, and on a position of the selected destination within the tree; and a routing module configured to maintain connectivity and to direct connectivity for the session with at least the selected destination using the communications protocol and to transfer the session from the selected destination to an available destination in a different level of the tree in response to a session level transfer request;

wherein the identity module, the hierarchy module, the endpoint selection module, and the routing module comprise one or more of logic hardware and a non-transitory computer readable storage medium storing executable code.

2. The apparatus of claim 1, wherein the identity module is configured to directly represent the session endpoint for the communication protocol, the communication protocol comprising a Session Initiation Protocol (SIP) and the session controller comprising an external system comprising one or more of a SIP enterprise session controller (ESC), a SIP local session controller (LSC), and a SIP trunk.

3. The apparatus of claim 1, wherein the session comprises one or more of an audio, text, video, and document session.

4. The apparatus of claim 1, wherein the session endpoint is associated with a user and the session endpoint comprises one or more of a telephone number for the user and an extension for the user.

5. The apparatus of claim 1, wherein the session endpoint is associated with a user based on a search query presented to a Lightweight Directory Access Protocol (LDAP) server, the search query identifying only the user.

6. The apparatus of claim 1, wherein the session endpoint is associated with a user based on an identification of the user by a public key certificate.

7. The apparatus of claim 1, wherein the session endpoint is associated with a role, the role comprises a pool of multiple associated users, and the endpoint selection module is configured to select the destination based on information received from one or more devices associated with at least one of the multiple associated users.

8. The apparatus of claim 1, wherein the session endpoint is associated with a resource, the resource comprising one or more of a fax machine, a conference room, a vehicle, a station, equipment, and a facility.

9. The apparatus of claim 1, wherein the session endpoint is associated with a project comprising a name, an objective, and one or more project members, a project member comprising one or more of a role and a user.

10. The apparatus of claim 1, wherein the session endpoint is associated with an organization's contact role and ownership of the organization's contact role remains in full possession and control of the organization even though the routing module is configured to extend the session for the organization's contact role onto a user's personally owned device in response to the endpoint selection module selecting the user's personally owned device as the destination.

11. The apparatus of claim 10, further comprising a security module configured to prevent unauthorized access to the organization's data, the organization's data residing on the user's personally owned device and the organization's data resulting from the session, the security module further configured to remove the organization's data from the user's personally owned device in response to a trigger, wherein the security module comprises one or more of logic hardware and a non-transitory computer readable storage medium storing executable code.

12. The apparatus of claim 11, wherein the security module is configured to protect ownership and privacy of the user's personally owned device while the user's personally owned device is used as the selected destination by an organization for the organization's purposes.

13. The apparatus of claim 1, wherein the information from the destination comprises a relative proximity of the destination to a physical station and the endpoint selection module is configured to select the destination from a plurality of destinations in response to the selected destination being closest to the physical station.

14. The apparatus of claim 1, wherein the information from the destination comprises a geographic location of the destination and the endpoint selection module is configured to select the destination from a plurality of destinations in response to the geographic location of the selected destination being physically located within a predetermined site's geographic boundaries.

15. The apparatus of claim 1, wherein the information from the destination comprises one or more of an indicator of whether the destination is currently engaged in a different session, a proximity of the destination to a predefined location, a current network connection associated with the destination, an indicator of a level of ambient noise detected from a microphone of the destination, activity data for a user associated with the destination from a wearable activity tracker device of the user, a current velocity associated with the destination, the absence of other destination devices in proximity with equivalent direction and velocity, and a previous session connectivity history of the destination.

16. The apparatus of claim 1, wherein the routing module is configured to transfer the session to an unauthenticated guest destination known to the selected destination.

17. The apparatus of claim 16, wherein the session transfer to the guest destination is negotiated via Near Field Communications (NFC) between the guest destination and the selected destination.

18. The apparatus of claim 1, further comprising a transient collective module configured to determine current members of a transient collective group and to determine addresses of the determined current members, the endpoint selection module configured to select one or more of the determined current members as destinations for the session and the routing module configured to maintain connectivity and to direct connectivity for the session to the one or more determined addresses of the one or more of the determined current members, wherein the transient collective module comprises one or more of logic hardware and a non-transitory computer readable storage medium storing executable code.

19. The apparatus of claim 1, wherein the destination comprises a secure footprint executing on a personally owned device of a user, the information from the destination received from the secure footprint.

20. The apparatus of claim 1, further comprising a portal module configured to provide a page associated with the session endpoint to one or more users, the page comprising information of the session and the one or more users having security authorization for the session, wherein the portal module comprises one or more of logic hardware and a non-transitory computer readable storage medium storing executable code.

21. The apparatus of claim 20, wherein the page comprises a profile page for one or more of a role, a resource, and a project associated with the session endpoint and the information comprises one or more of text, audio, and video from the session.

22. The apparatus of claim 21, wherein the portal module comprises one of a plurality of decentralized portal modules operating at different locations for different organizations, such that the plurality of portal modules are configured to provide the one or more users with access to profile pages for the different organizations, at least a portion of the profile pages for the different organization indexed and accessible by role, wherein each of the plurality of portal modules comprises one or more of logic hardware and a non-transitory computer readable storage medium storing executable code.

23. A system, comprising:
   a hardware communications switch comprising a session controller for a communications protocol; and
   an endpoint controller configured to:
   represent a plurality of endpoints associated with different roles within an organization to the session controller;
   dynamically route sessions for the plurality of endpoints to different destinations based on information received at the endpoint controller from the different destinations;
   extend at least one of the sessions onto a user's personally owned device in response to selecting the user's personally owned device as one of the different destinations;
   prevent unauthorized access to the organization's data residing on the user's personally owned device, the organization's data resulting from the one of the sessions;
   remove the organization's data from the user's personally owned device in response to a trigger; and
   protect ownership and privacy of the user's personally owned device while the user's personally owned device is used as one of the different destinations by the organization.

24. The system of claim 23, wherein the endpoint controller is integrated with the hardware communications switch.

25. The system of claim 23, wherein the endpoint controller comprises a hardware appliance in communication with the hardware communications switch.

26. The system of claim 23, wherein the endpoint controller comprises one or more of a hardware circuit and a non-transitory computer readable storage medium storing computer executable code.

27. An apparatus comprising:
   means for receiving a communication for a role in an organization, the role comprising a pool of one or more members;
   means for dynamically selecting a member of the pool for a session for the communication based on information received from one or more devices associated with at least one of the one or more members; and
   means for providing a profile page for the role in the organization in a decentralized network of multiple organizations to one or more users, the profile page comprising information from the session for the communication, the one or more users having security authorization for the session, the decentralized network of multiple organizations providing the one or more users with access to profile pages for the multiple organizations, at least a portion of the profile pages indexed and accessible by role.

* * * * *